Figure 1:
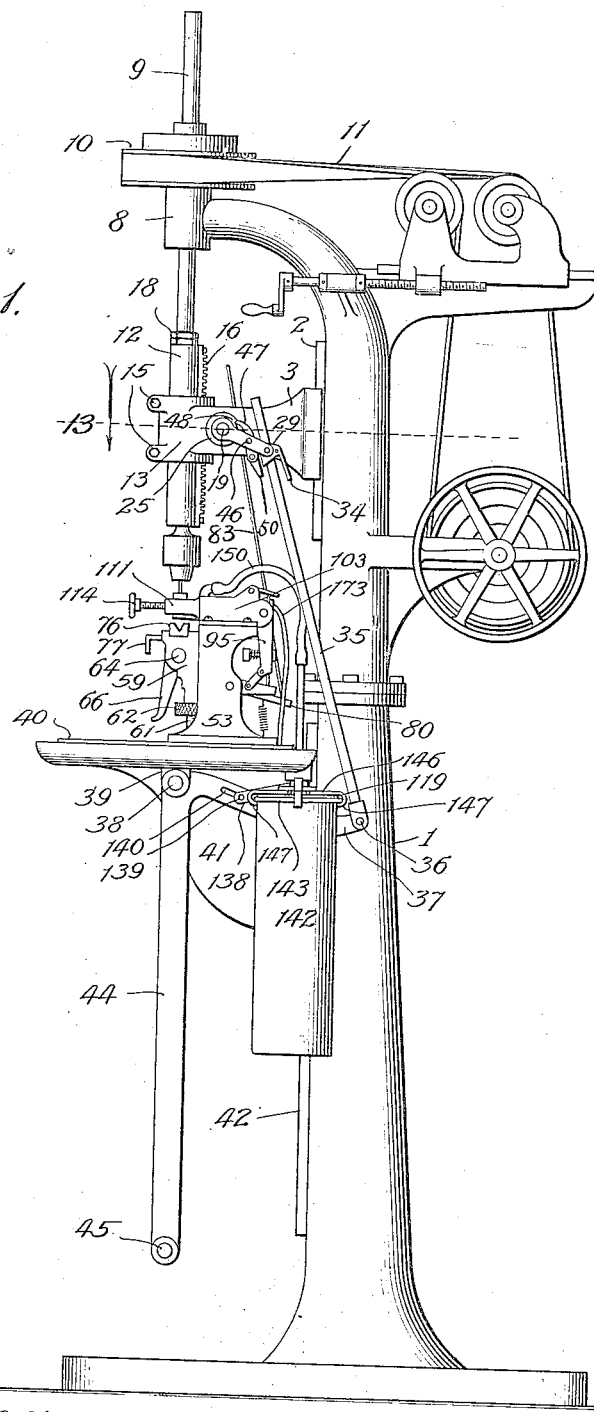

T. P. CAULKINS.
DRILLING MACHINE.
APPLICATION FILED DEC. 20, 1915. RENEWED NOV. 24, 1917.

1,422,031.

Patented July 4, 1922.
5 SHEETS—SHEET 1.

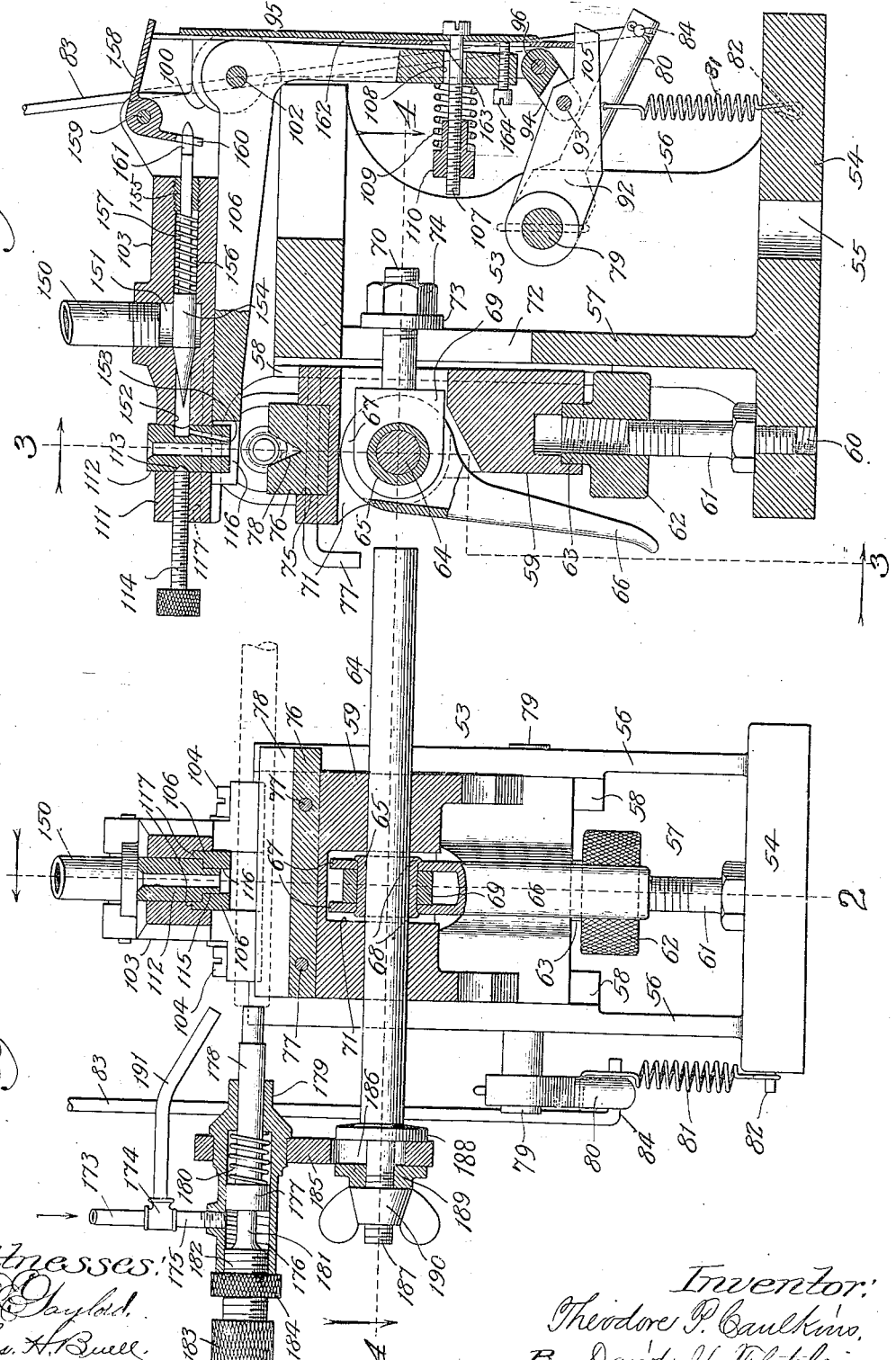
T. P. CAULKINS.
DRILLING MACHINE.
APPLICATION FILED DEC. 20, 1915. RENEWED NOV. 24, 1917.
1,422,031.
Patented July 4, 1922.
5 SHEETS—SHEET 2.
Inventor:
Theodore P. Caulkins,
By David W. Fletcher,
Attys

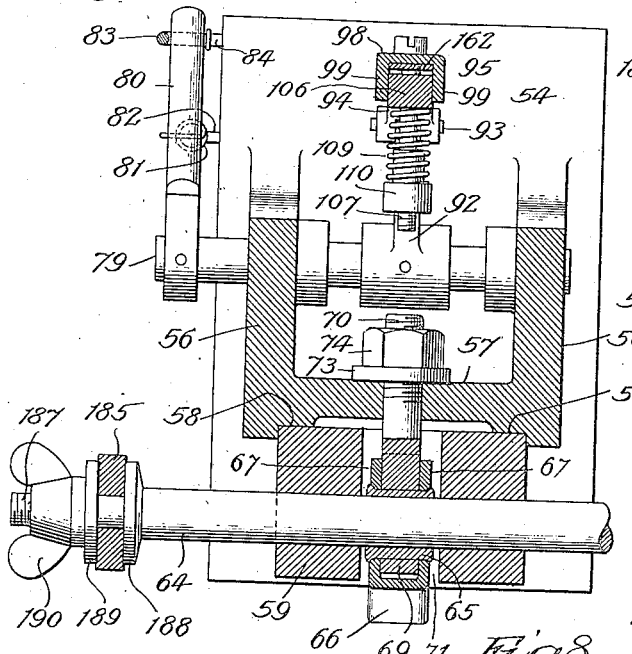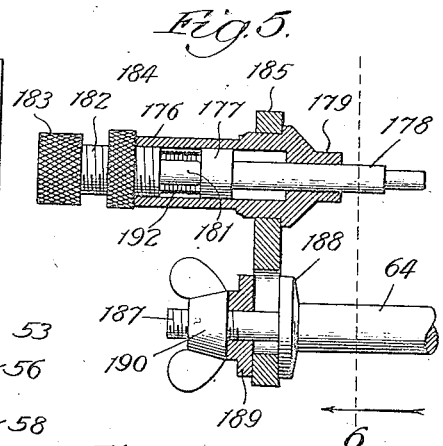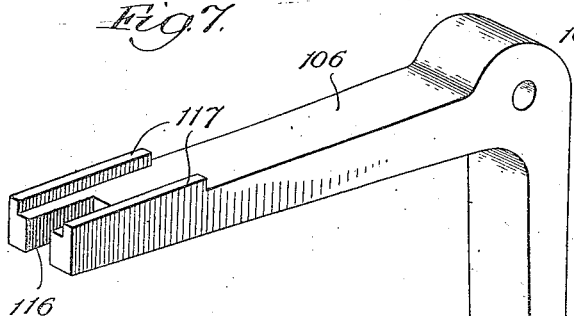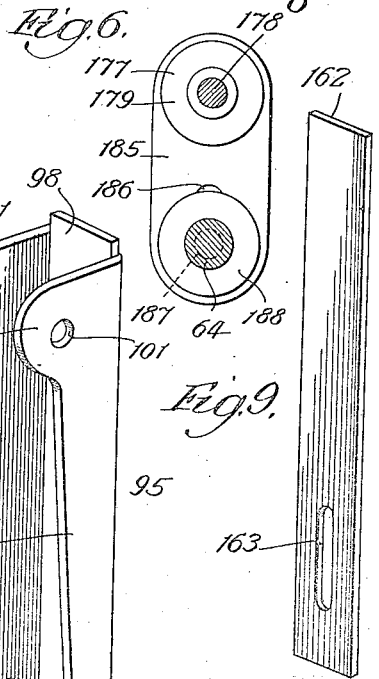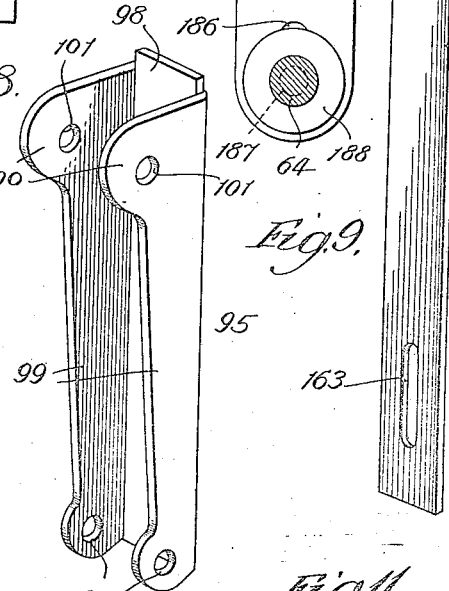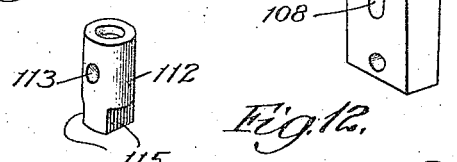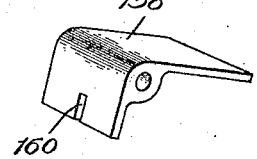

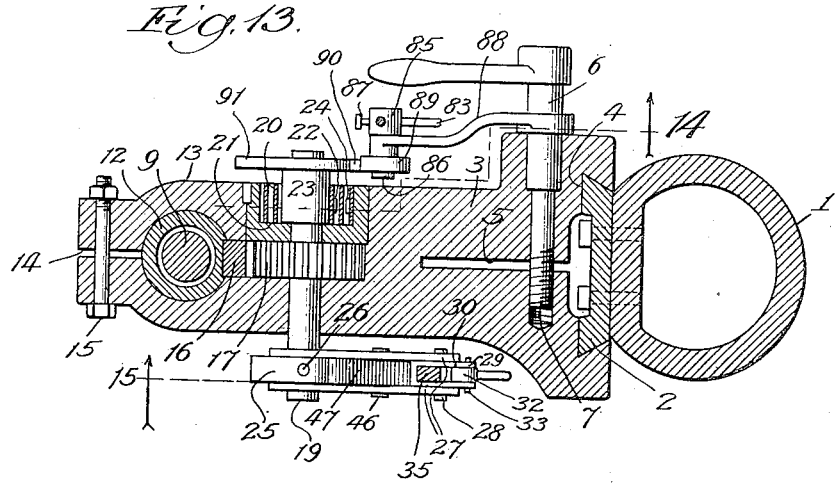
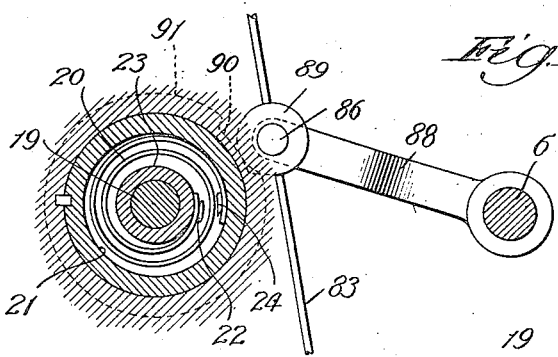
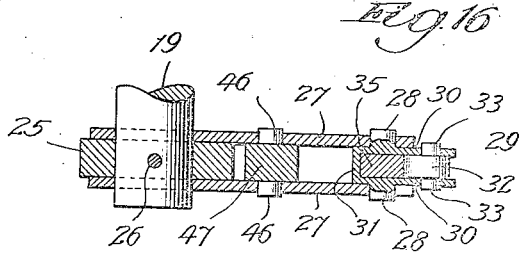
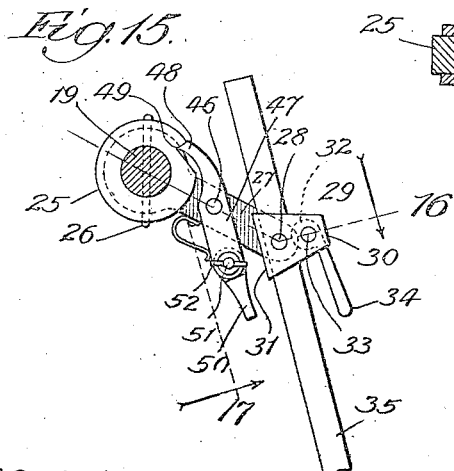
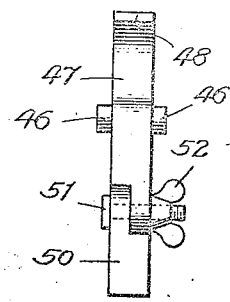

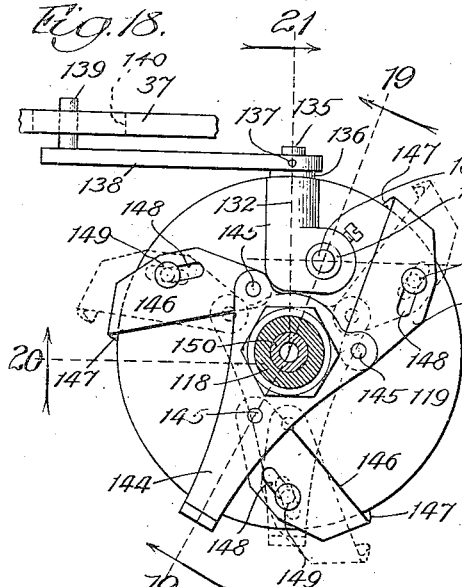
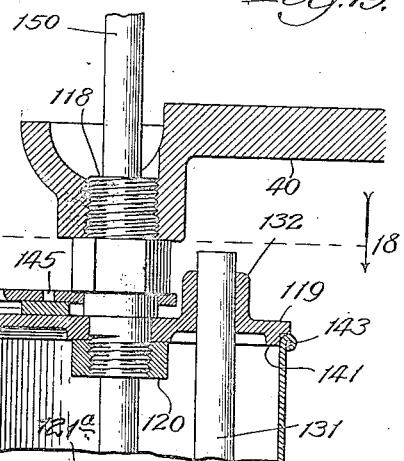
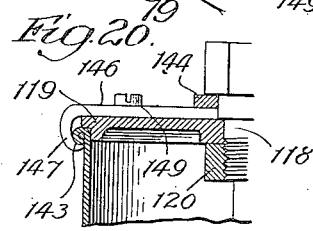
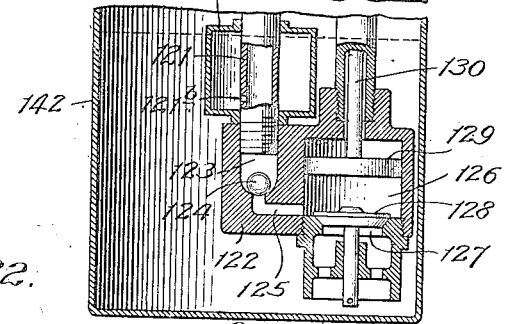
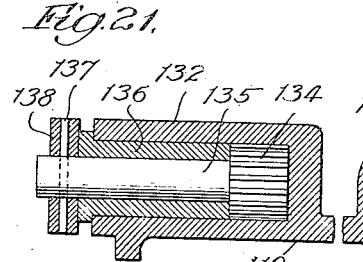
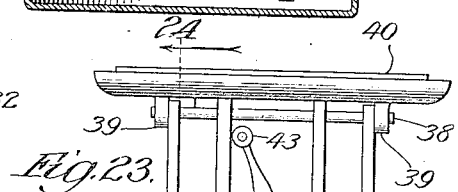
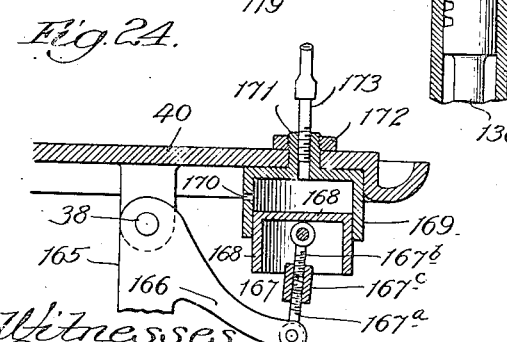
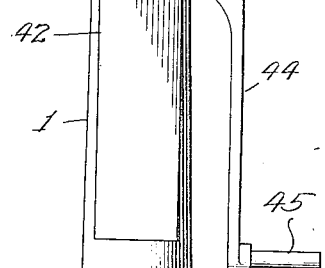

UNITED STATES PATENT OFFICE.

THEODORE P. CAULKINS, OF CHICAGO, ILLINOIS, ASSIGNOR TO EDWARD T. WRAY, OF CHICAGO, ILLINOIS.

DRILLING MACHINE.

1,422,031.  Specification of Letters Patent.  Patented July 4, 1922.

Application filed December 20, 1915, Serial No. 67,804. Renewed November 24, 1917. Serial No. 203,866.

*To all whom it may concern:*

Be it known that I, THEODORE P. CAULKINS, a citizen of the United States, residing at Chicago, in the county of Cook and State of Illinois, have invented certain new and useful Improvements in Drilling Machines, of which the following is a description, reference being had to the accompanying drawings, forming a part of this specification, in which corresponding letters of reference in the different figures indicate like parts.

My invention relates to machines for drilling and for other analagous work, such, for example, as tapping, threading, reaming, countersinking and the like, and my object, generally stated, is to provide simple and effective means for automatically clamping and discharging the work, removing the chips and lubricating and cooling the drill or other tool in such a way that the several mechanisms may cooperate to enable a maximum amount of work to be accomplished as a result of a minimum number for movements of the operator,—all of which is hereinafter more particularly described and definitely pointed out in the claims.

In the drawings,

Figure 1, is a side elevation of a drilling machine embodying the features of my invention, Figure 2, is an enlarged vertical section of the drilling-head taken upon line 2—2, Figure 3, viewed in the direction of the arrow there shown, Figure 3 is a vertical section taken upon the line 3—3, Figure 2, viewed as indicated by the arrows there shown, Figure 4, is a section in plan taken upon line 4—4, Figures 2 and 3, Figure 5, is a detail view showing a modified construction of the work-discharging mechanism represented in Figure 3, Figure 6, is a section taken upon the line 6—, Figure 5, viewed in the direction of the arrow there shown, Figure 7, is a perspective view of the elbow clamping-lever forming one of the work-clamping elements, Figure 8, is a perspective view of the take-up member forming a housing for the clamping-lever.

Figure 9, is a like view in detail of the bar for actuating an oil controlling needle-valve, Figure 10, is a perspective view in detail of the removable drill-bushing, Figure 11, is a like view of the elbow-lever interposed between an oil controlling needle-valve and the actuating bar shown in Figure 9, Figure 12, is a like view of the oil controlling needle-valve, Figure 13 is an enlarged sectional view in plan, taken upon the line 13—, Figure 1, Figure 14, is a section taken upon the line 14—, Figure 13, viewed in the direction of the arrow there shown, Figure 15, is a detail view partly in section, taken upon the line 15—, Figure 13, viewed in the direction of the arrow there shown, Figure 16, is a sectional view in plan, taken upon the line 16—, Figure 15, Figure 17, is an elevation on line 17—, Figure 15, viewed as indicated by the arrow, Figure 18, is a plan partly in section taken upon the line 18—, Figure 19.

Figure 19, is a section taken upon the line 19—19, Figure 18, viewed in the direction of the arrow there shown, Figure 20, is a sectional view in detail taken upon the line 20—, Figure 18, viewed as indicated by the arrow there shown, Figure 21, is a section taken upon the line 21—, Figure 18, viewed in the direction of the arrow there shown, Figure 22, is a section taken upon the line 22, Figure 18, viewed as indicated by the arrow, Figure 23, is a front elevation of the main support showing the treadle mechanism, and Figure 24, is a vertical section taken upon the line 24—, Figure 23, viewed in the direction of the arrow there shown.

Referring to the drawings, 1, Figures 1, and 13, indicates the usual upright drill-press support which is provided upon the upper part of its front face with a dove-tailed vertical guide member 2, formed upon or rigidly attached thereto in any well known way, serving as a support for an adjustable bracket 3, provided with a counterpart dove-tailed groove 4, therein, for the reception of the dove-tailed guide member 2. Said bracket is cleft or split as shown at 5, Figure 13, in the line of the groove and a clamping-bolt 6, is passed loosely into a bore in one part of said bracket and tapped into the other part thereof as shown at 7, so that upon adjusting the height of the bracket and tightening the bolt, the former may be firmly and securely clamped in place, in the usual way. The upper portion of the standard is bent forward and provided with the usual head 8, Figure 1, which is vertically bored for the reception of the ordinary drill-stock or spindle 9, having a driving pulley 10, splined thereon and connected by means of a belt 11, in a well known way with a source of power.

The drill stock is passed loosely through a sleeve 12, also shown in Figure 13, slidably fitted within a vertical bore formed within a head 13. Said head is split as shown at 14, in said last named figure and is provided with clamping-bolts 15 for the purpose of taking up wear. The head 13 is recessed in the plane of the axis of the drill-spindle for the reception of a rack 16, which is formed upon or rigidly attached to the sleeve 12, and a pinion 17, Figure 13, adapted to engage said rack. Lock-nuts 18, or other adjustable means are provided upon the drill spindle to engage the upper end of the sleeve to enable the spindle to be raised or lowered by the movement of the rack. The pinion 17, is keyed to a horizontal shaft 19, journalled in said head, which is adapted to be rotated to a limited extent by means of a coiled spring 20, also shown in Figure 14, located within a recess 21, in said head, the inner end of said spring being attached at 22, to a hub 23, upon the shaft, while the outer end is attached at 24 to the wall of the recess.

A disk 25, also shown in Figures 15 and 16, is rigidly attached by means of a pin 26, to the shaft 19. Parallel arms 27, 27, are loosely journaled upon said shaft upon opposite sides of the disk 25, between which is pivoted by means of trunions 28, a clamping member generally designated by 29, which member is provided with elongated parallel side walls 30, and an end wall 31, arranged at right angles thereto. A clamping eccentric 32 is pivoted at 33 in said clamping member and provided with a handle 34. An actuating rod 35, is interposed in the clamping member between said rear wall 31 and said eccentric and is adapted to be rigidly clamped therein by means of said eccentric. The lower end of said actuating rod is jointedly connected at 36, Figure 1, to an arm 37, of an elbow lever pivoted upon a rod 38, extending horizontally through lugs 39, as more clearly shown in Figure 23, formed upon the under face of a table or work shelf 40, having a bracket portion 41, grooved in the rear to receive a counterpart dove-tailed guide member 42, formed upon the upright support 1, and adapted to be locked in position by means of the usual clamping member 43, Figure 23. The depending arm 44 of the actuating elbow-lever has a treadle 45, upon its lower end which is adapted to hang normally in a vertical position as shown in Figure 1, but when moved rearwardly serves to lift the rod 35 for the purpose of forcing the spindle downwardly toward the work, through the action of the rack and pinion, which may be accomplished and varied in degree, by means of the following described devices.

Pivotally mounted between the arms 27, by means of trunnions 46, Figures 1, 13, 15, 16 and 17, is a pawl 47, the tooth 48 of which is adapted to engage a notch 49, better shown in Figure 15, formed in the periphery of the disk 25. To the opposite end of the pawl, which is considerably elongated, is jointedly attached an extension 50, which is adapted to be adjusted to any desired position and rigidly locked by means of a bolt 51, and thumb-nut 52. The pawl is so adjusted as to be in normal engagement with the notch, and when the rod 35 is lifted through the action of the treadle, the disk 25, is caused to rotate against the action of the spring 20, thereby rotating the pinion 17, and causing the drill spindle and drill to be moved downwardly to the work. As the rod 35 is raised the angular relation between it and the pawl is changed until the part 50, is caused to contact with the rod, when a further movement serves to release the pawl from the notch. As soon as this occurs the spindle is lifted to its normal position through the recoil of the spring 20. When the treadle is reversed, the pawl is again caused to engage the notch so as to repeat the operation. The extent of movement of the disk may be varied to the utmost degree by merely adjusting the extension 50 with relation to the rod 35, which in its turn is also adjustable for variable work through the clamp 32.

Having described the means for controlling the action of the spindle to move the drill to and from the work, I will now explain the improved means for adjusting, clamping and discharging the work.

Rigidly attached to the work table or rest 40, Figure 1, is a stationary frame member generally designated by 53, and better shown in Figures 2, 3 and 4. Said member is provided with a base-portion 54, having a bore 55, Figure 2, through which a bolt may be passed for attaching it to the table, and vertical parallel web-portions 56, spaced apart, which are integral with a transverse vertical web-portion 57. The parts 56 are extended beyond the forward face of the web 57, and are cut away upon their inner faces as shown at 58, to form a vertical guide-way for the reception of an adjustable member 59. Tapped into the base 54, as shown at 60, Figure 2, is a vertical adjusting post 61, threaded as shown, to receive an adjusting nut 62, the upper portion of which is reduced in diameter as shown at 63, and swiveled into a bore formed in the lower end of the block 59 to enable the height of the latter to be adjusted at will. The following described means is provided for clamping the block 59 in place.

Projected through a horizontal bore in the block 59, is a gage-rod 64, which also passes through a bore in an eccentric sleeve 65, which sleeve is attached to a clamping arm 66, formed from sheet-metal, the head of which consists of parallel flanges 67, bored to receive said sleeve, the ends of which are swaged as shown at 68, Figure 3, to secure it rigidly therein. Said eccentric is passed loosely through a bore in a head 69, of a bolt 70, Figures 2, and 4, which head is enclosed between the flanges 67 of the arm. The block 59 is recessed as shown at 71 to receive the head of the arm 66, and that of the bolt. The bolt 70 is passed loosely through a vertical slot 72, Figure 2, in the web 57, and is provided with a washer 73, and nut 74, to provide for accurate adjustment in clamping the block in place. The eccentric sleeve 65, is adjusted with reference to the arm 66, so that when said arm is in its normal or locking position as shown in Figure 2, the point of greatest eccentricity of the sleeve will be upon the left side of the rod 64, in the plane of the axis of the bolt 70, and the nut 74 should be so adjusted that when the eccentric is so positioned, the block 59 will be rigidly clamped in place, but when said arm is raised so as to shift the relative position of the eccentric, the lock may be loosened to provide for vertical adjustment through the action of the nut 62.

A lateral horizontal channel 75 is formed in the upper face of the part 59 for the reception of a removable pillow-block or work-rest 76, which is detachably secured in place by means of pins 77, adapted to enter registering bores in the part 59 and block 76. In the example illustrated, the block is provided with a longitudinal groove 78, into which a rod or other "work" may be placed for drilling as indicated in dotted lines in Figures 2 and 3.

The following described mechanism is provided for clamping the work in position during the drilling operation. Journaled in bearings in the walls 56, is a horizontal rock-shaft 79, Figures 2, 3 and 4, to which is pinned or rigidly attached an operating arm 80, adapted to be held normally in the position shown in Figures 2 and 3 by means of a coiled spring 81, one end of which is attached thereto and the other to a pin 82, upon the base 54. A rod 83, also shown in Figures 1, 13 and 14, is jointedly connected as shown at 84 or in any approved way, to the free end of said arm. Said rod is extended upwardly and passed through a bore in the head 85 of a wrist-pin 86, Figures 13 and 14, in which it is adjustably secured by means of a set-screw 87. The wrist-pin 86 is passed loosely through a bore in the free end of an arm 88, the opposite end of which is journaled upon the body of the clamping-screw 6. A friction roller 89 is journaled upon the inner end of the pin 86, and is adapted to rest normally in a notch 90, formed in the periphery of a disk 91, rigidly attached to the shaft 19. As the shaft and disk are rotated through the action of the rod 35, shown in Figures 13 and 15, the wheel 89 is caused to ride out of said notch, thereby tilting the arm 88, and pulling upwardly upon the rod 83 and in turn tilting the rock-shaft 79. Pinned or otherwise rigidly attached to the latter shaft is an arm 92, Figures 2 and 4, to which is jointedly connected at 93 to a short link 94, the opposite end of which is connected to the lower end of a housing or lever member generally designated by 95, Figures 2, 4 and 8, by means of a pin 96, which is passed through bores 97, Figure 8, in the lower end of said housing. Said housing is preferably formed from sheet-metal bent as shown to form a rear wall 98 and parallel side walls 99, which are forwardly extended at the upper end to form lugs 100, having bores 101, therein for the reception of a pivot-pin 102, which is passed through a horizontal bore at the rear of a top housing 103. Said housing is rigidly attached to the main frame by means of screws 104, Figure 3, and is recessed as shown for the reception of said lever and other parts. The link 94 is normally inclined as shown in Figure 2, to form a knee-joint and is bifurcated so as to straddle the arm 92. An extension 105 is formed upon said arm for the purpose of engaging said link when in proper alignment with the arm to limit the movement of the knee-joint to its maximum throw as well as for a further purpose hereinafter explained.

Pivotally mounted upon the pin 102 is an elbow lever 106, also shown in Figure 7, the depending arm of which is enclosed within the housing 95. The purpose of said elbow-lever is to clamp the work upon the rest 76; but inasmuch as this should be done with more or less of a yielding action, in order to avoid a possible breakage of the lever, I have provided for such yielding as follows. A bolt 107, Figures 2 and 4, is passed through a bore near the lower end of the lever 95, and thence through an enlarged bore 108, also shown in Figure 7, in the depending arm of the elbow lever 106. A stiff coiled spring 109 is interposed between the lever arm and a nut 110, upon the bolt 107, so that when the lever 95 is positively actuated by the knee-joint action, said elbow lever will likewise be moved but with a yielding outward pressure upon the depending arm. This in turn will cause the horizontal arm of the elbow lever to press downwardly upon the work placed upon the rest, to clamp it firmly in place.

The top housing 103 is extended forwardly as shown at 111, Figure 1, and is vertically bored for the reception of a removable drill-guide or bushing 112, shown in Figures 2, 3, and 10, which bushing is provided upon one face with a depression 113, adapted to receive the end of a horizontally disposed set-screw 114. Said bushing is cut away upon opposite sides as shown at 115, Figure 10, to permit the lower end thereof to enter a notch or recess 116, Figures 2, 3 and 7, in the end of the horizontal arm of the elbow-lever 106, to permit the latter to straddle said bushing. Vertical flanges 117, shown in full lines in Figures 3 and 7 and in dotted lines in Figure 2, are formed upon the upper face of the horizontal arm of the elbow lever 106, which are fitted to enter corresponding grooves in the housing for the purpose of preventing any possible lateral play of the former.

The means for supplying oil to the drill which is intended to coact with the other parts, will now be described.

A short connecting tube 118, Figures 18, 19 and 20, has its upper end tapped into a bore in the bracket supported shelf 40, while its lower end is passed through a central bore in a circular supporting plate member 119, which member is rigidly secured against a shoulder upon said tube by means of a nut 120. Rigidly connected with the lower end of the tube 118, is a short tube 121, Figure 19, the lower end of which is tapped into a bore in the top of a pump casing or fitting 122. The lower portion of said bore forms a valve chamber 123, having a ball check-valve 124. Said valve-chamber is in communication through a duct 125, with a pump-chamber or cylinder 126, having an induction opening 127 in the bottom adapted to be normally closed by means of a check-valve 128. A piston 129, in said chamber is provided with a piston-rod 130, enclosed within a tube 131, also shown in Figure 22, the lower end of which tube is threaded into the upper end of the pump cylinder and the upper end passed through a housing 132, formed upon the plate 119. The upper end of the piston-rod is enlarged to fit closely within the tube and has a rack 133, formed thereon and adapted to be engaged by the teeth of a pinion 134, upon a shaft 135, Figures 18, 21, and 22, journaled within a bushing 136 fitted within the casing 132. Rigidly attached to the outer end of said shaft by means of a pin 137, is an arm 138, having a wrist-pin 139, in engagement with a slot 140, in the lever arm 37, Figures 1 and 18.

The plate 119, is provided with an annular flange 141, Figure 19, around which is closely fitted a receptacle 142, adapted to enclose the pump mechanism described and to form an oil reservoir. Said reservoir is flanged or beaded at the top as shown at 143, and the disk 119 forms a cover therefor. The two are detachably connected by means of the following described clamping mechanism.

Journaled upon the tubular member 118, as best shown in Figures 18, 19 and 20, is a flat arm 144 to which is pivotally connected by means of pins 145, located at equal distances from the axis of said arm and from each other, clamping members 146, formed from flat sheet-metal pieces, the outer ends of which are bent downwardly and inwardly as shown at 147, so that, when in a normal position they may pass beneath and engage the head 143, as best shown in Figure 20. Each clamping member is provided with a slot 148, Figure 18, for the reception of a pivot-screw 149, which is tapped into the plate 119; said screws being located at equal distances from each other and from the center of the plate. When the actuating plate, or arm 144, is in its extreme abnormal position, the clamping members 146 will assume the expanded positions respectively as indicated in dotted lines. When so positioned, the receptacle 142, may be held with its top against the coverplate 119, and upon reversing the position of the arm 144, as represented in Figure 18, the hooks 147 of the clamping members will be caused to engage the head 143; thereby clamping the oil reservoir firmly in place.

Connected with the upper end of the tubular member 118, is a supply tube 150, Figures 1, 2, 3, 18 and 19, which is bent as shown in Figure 1, to communicate with a bore or chamber 151, Figure 2, in communication with a horizontal duct 152, in the forward part of the housing 103. A small duct 153, leads from the duct 152, downwardly and inwardly towards the axis of the drill. The duct 152 is normally closed by means of a needle-valve 154, also shown in Figure 12, the stem of which is extended through a packing 155, in the outer end of a bore 156, which is in alignment with the duct 152. A coiled spring 167 serves to hold the valve normally closed. An elbow lever 158 is located in an opening in the rear of the housing 103, being pivotally mounted upon a pin 159. The short arm of said lever is provided with a notch 160, Figures 2 and 11, adapted to receive a cutaway portion 161, Figures 2 and 12, upon the valve-stem. The rear arm of the elbow-lever is arranged to bear upon the upper end of a thin flat bar 162, Figures 2, 4 and 9, which is located within the housing 95, in the rear of the vertical arm of the elbow lever 106. Said bar is provided with a slot 163, to receive the bolt 107, and a set screw 164, which is passed through the lower end of said arm and against the housing 95 for adjusting the relation between the two. The lower end of the bar 162, is caused to rest upon the extension 105 of the arm 92 and by reason of the slot 163 is free to be moved vertically to actuate the elbow lever 158. When the arm 92 is raised through the action of the rock-shaft, the rear arm of the elbow lever 158 is caused to be tilted, thereby opening the needle-valve 154 against the resistance of the spring 157. An air-chamber 121$^a$, Figure 19, is in communication with the tube 121, through an opening 121$^b$, the purpose being to provide for a short movement of the pump piston after the closing of the needle-valve.

The means for gaging and discharging the work and removing the chips formed by the drill will now be described.

Branching laterally from the lever-arm 44, and thence upwardly in parallel relation thereto, is a supplemental or secondary lever-arm 165, Figures 23 and 24, which is pivoted upon the rod 38, and has a short arm 166 connected by means of an adjustable or extensible link generally designated by 167. Said link consists of two parts 167$^a$ and 167$^b$, which are threaded with right and left hand screw threads respectively, and connected by means of a sleeve or turn-buckle 167$^c$, having counterpart threads. The part 167$^a$ is jointedly connected to the lever arm 166, while the part 167$^b$ is connected in like manner to a piston 168, in a piston cylinder 169, having an air inlet 170, located at a predetermined distance below the upper end of the piston chamber, so that the latter may be in normal communication with the atmosphere. The adjustable link enables the piston to be normally located at a predetermined distance below the air inlet, so that it may be given a greater or less movement according to the thickness of the work, before closing the air inlet and commencing to compress air in the piston chamber. In other words, it should not commence its work until that caused by the companion lever-arm 37, namely the drilling and lubricating of the work, is completed, for reasons presently to be explained.

The cylinder 169 is provided with a nipple 171 upon its upper end which is projected upwardly through a bore in the table 40, and secured by means of a nut 172. Tapped into the bore of the nipple, so as to be in communication with the piston chamber, is a tube 173, which is extended upwardly and bent forwardly as shown in Figure 1, and thence downwardly, see Figure 3, into communication with a union 174, the lower end of which is connected by means of a short tube 175, with the interior of a hollow cylinder 176, in which is located a piston 177, having a gage rod 178 upon its right-hand end which is projected through a bore formed in an extension 179, of reduced diameter upon the end of the cylinder. A light, coiled spring 180, within the piston chamber, serves to hold the piston in its normal position, as shown, with its left-hand end against a stop consisting of a pin 181, having an enlarged portion 182, which is threaded into the cylinder. A knurled head 183, and lock-nut 184 enables the stop to be adjusted to any desired position and locked in place. The right-hand end of the stem 178 is adapted to serve as a stop to position the "work" or article to be drilled, as indicated in dotted lines.

The cylinder 176, is rigidly secured in a bore in the upper end of a supporting member 185, which is provided with a vertical slot 186, through which is projected a threaded extension rod 187, upon the left-hand end of the sliding rod 64. The latter is provided with a shoulder 188, which forms an abutment for the support 185. The latter may be adjusted as desired and clamped in place by means of a washer 189, and thumb-nut 190. A branch tube or nozzle 191, leads from the union 174 to a position immediately over the notch in the work rest 78, being inclined downwardly as shown, so as to direct a jet of air into said notch.

In the construction just described, the work is intended to be discharged through the action of compressed air upon the piston 177, when the drilling is completed and the work discharged, as will be presently explained; but in Figures 5 and 6 I have shown a modification in which all of the parts are the same in construction, except that no provision is made for admitting air into the piston cylinder; and in lieu of the spring 180, Figure 3, in front of the piston for holding it back against a rigid stop. I have placed a compression spring 192 upon the opposite side of the piston for holding it normally forward. The piston is shown in its abnormal position against the compressed spring, in which it is placed by the operator who pushes the work against it until it is arrested by the stop 181, where it is held by the clamping lever 106. Upon releasing the latter, the recoil of the spring 192, serves to throw the gage-rod 178, forward; thereby discharging the work. The air actuated gage is preferred as being more certain, inasmuch as no end-pressure is required for placing the work in position, and hence a possible displacement is avoided.

Having thus described the several features of the device, I will now explain its operation. The operator sitting with his foot upon the treadle 45, which is in the normal position shown in Figure 1, places the work in position as indicated in dotted lines in Figure 3, with its left-hand end against the gage-rod 178. The treadle is then actuated causing the arm 37, to push upwardly upon the rod 35, thereby actuating the parallel arms 27 to tilt the rock-shaft 19. When the rod 35 approaches nearly to its upward limit, the extension 50, upon the body of the pawl 47, Figure 15, is brought into contact with the rod, thereby releasing the tooth 48 of the pawl from the notch 49, in the disk 23, which permits the rock-shaft to be returned to its normal position through the recoil of the spring. In the meantime the tilting of the rock-shaft causes the rotation of the pinion 17, thus moving the rack 16 and sleeve 12 downwardly to feed the drill to the work, which latter is clamped in place by the simultaneous action of the elbow lever 106 thereon, caused by the tilting of the disk 91, which causes the roller 89 to ride out of the notch 90, thereby pulling upwardly upon the rod 83 and tilting the rock-shaft 79 through the arm 80, against the action of the spring 81, thus tilting the knee-joint member 94, with the arm 92, forcing the housing lever 95 outwardly and with it the depending arm of the elbow lever 106, which is permitted to yield through the resiliency of the spring 109.

At the same instant the arm 138, Figures 1 and 18 is moved upwardly by the action of the treadle, thereby tilting the rock-shaft 135, and actuating the piston 129 of the oil-pump through the pinion 134 and rack 133, to force the oil upwardly through the duct 125, tubes 120 and 150 to the valve-chamber 151. Coincident with this movement, the needle-valve 154 is opened by the action of the elbow-lever 158, which is caused by the lifting of the bar 162, when the arm 92 is raised. The oil is thus forced into the channel 152 and discharged through the duct 153 with considerable force against the drill. When the treadle is moved far enough to cause the tooth 48 of the pawl to be released from the notch 49, thus freeing the disk 25 and enabling the rock-shaft 19 to be reversed, the drill to be withdrawn from the work and the clamping lever released, the piston 168 will have been moved by the arm 166 past the air opening 170, thereby preventing the escape of air except through the tube 173. A further movement of the treadle which then moves idly as to the other parts described, serves to force the entire volume of air through the tube 173 to the union 174, Figure 3, where the current is divided, a portion going through the tube 175 into the piston chamber to force the piston 177 forward to discharge the work, while a jet is blown through the tube 191 to discharge the chips from the rest 76. Upon the release of the pawl 47, as described, the recoil of the spring 81 causes the arm 92 to be lowered, and with it, the bar 102, thus permitting the spring 157 to close the needle valve 154 and arresting the flow of oil. Upon reversing the treadle the piston 129, Figure 19, is lifted to draw in a new charge of oil, and the piston 168, Figure 24, is reversed to permit a fresh charge of air to enter the piston cylinder through the inlet opening 170. It is important that the piston 168 should always be adjusted with reference to the air inlet 170, so that it cannot commerce its work until the treadle shall have advanced far enough to complete the drilling operation and to allow the drill to be withdrawn and the work-holding clamp to be released. The proper adjustment of said piston will depend in all cases upon the relative thickness of the work.

It is obvious that the work-holding and gaging parts may be adjusted indefinitely to conform to any necessary variations in character or size of work.

I have found in practice that a very small jet of oil directed with force against the drill in the manner described exerts a cooling action thereon far in excess of that caused by merely permitting a normal flow around the drill. Under the latter practice, which has been heretofore employed, the maximum peripheral speed of the drill cannot safely exceed forty or eighty feet per minute, making allowance for hardness of material, while, with my improvement it may run as high as two hundred and thirty-five feet per minute without injury to the drill.

Inasmuch as the drill is kept cool and the clamping, releasing and the discharge of the work, together with the removal of the chips, is performed automatically, it is only necessary for the operator to pick up and insert the pieces simultaneously with the release of the treadle, so that the quantity of work which may be done with a single spindle is far in excess of what may be accomplished by a number of spindles under the old methods.

In the example illustrated, I have shown and described a treadle in lieu of a well known form of hand-lever as the preferable form of actuating device or prime mover, inasmuch as its use leaves both hands of the operator free, but I do not wish to be limited thereto. I have also shown and described the work-rest with the clamping and other parts in connection with a drill as the one tool with which they would ordinarily be applied; but for other analogous purposes it is obvious that other tools, such, for example, as those for milling, threading, tapping, reaming, or countersinking, might be used without departing from the essential principle of the invention.

It will be noted that there is a primary source of power for rotating the tool holder, and that the means for moving the tool holder and work holder relatively to feed the tool to the device to be acted upon is independent of this primary source of power. This is of vital importance, because it permits the tool to be fed at varying speeds depending upon the resistance opposing the tool, thus greatly increasing the speed of action and at the same time safeguarding the tool. The operator can feel as it were the action of the tool, and can feed it according to this and thereby get a maximum efficiency with a minimum danger to the tool.

In the specification and claims I have used the term "oil" in describing the material for lubricating the tool, but by this term I mean to include any suitable lubricant which when discharged on the tool during its operation, will prevent it from overheating.

Having thus described my invention, I claim:—

1. A machine of the character described, comprising, in combination, a primary source of power, a tool adapted to be actuated thereby, means for normally holding said tool in an inoperative position, a work support, work clamping means for clamping work thereon, tool feeding means, an actuator held normally in an inoperative position to be controlled by an operator, means for connecting said actuator with said work clamping means and means for connecting the same with said tool feeding means to bring said work clamping and tool feeding means into operation when said actuator is moved to an operative position.

2. A machine of the class described, comprising, in combination, a source of power, a tool to be actuated thereby but held normally in an inoperative position, a work support, work clamping means, tool feeding means, an operating lever held normally in an inoperative position, means controlled thereby for bringing said work clamping means into action and means connected therewith for actuating said tool feeding means.

3. A machine of the character described, comprising, in combination a power actuated tool, a work-support, an actuating lever, means in operative connection with said lever for feeding the tool to the work, a source of oil supply and means operatively connected with said lever for directing a jet of oil under pressure against said tool and work during the operation of the tool.

4. A machine of the class described, comprising, in combination, a power actuated tool having flutings therein, a work support, an actuating lever, means controlled thereby for clamping the work upon said support, means actuated by said lever for feeding the tool to the work and means in operative connection with said actuating lever for directing a jet of oil under pressure against the tool and work at an acute angle to the axis of the tool during its operation to cause the fresh cool oil to enter the flutings of the tool and absorb heat.

5. A machine of the class described, comprising, in combination, a power actuated tool, a work-support, means for clamping the work thereon, means for feeding the tool to the work, an oil-pump, means in operative connection therewith for directing a jet of oil against the tool and work when the pump is actuated, a valve for shutting off said jet when the operation is completed, an air-pump in operative connection with the discharge side of the pump piston for continuing the air pressure to the last instant while permitting an excess movement of the piston, an actuating lever and means for severally connecting the same with said work clamping and tool feeding means respectively as well as with said oil pump and shut-off valve.

6. A machine of the class described, comprising, in combination, a power actuated tool, a work-support, a work-clamping lever having one arm in operative proximity to the work, a normally relaxed knee-joint connected with said lever for actuating the same to clamp the work when the knee-joint is straightened, a lever, lever actuated means for straightening said knee-joint, means for feeding the tool to the work, means for releasing said lever-actuated means when the operation is completed, and means for withdrawing the tool and reversing the action of said knee-joint to unclamp the work.

7. A machine of the class described, comprising, in combination, a power actuated tool, a work-support, a work-clamping lever having one arm in operative proximity to the work, a normally relaxed knee-joint connected with said lever for actuating the same to clamp the work when the knee-joint is straightened, yielding means interposed between said clamping lever and said knee-joint to provide against breakage when stress is applied to said lever, a primary actuating lever, means actuated thereby for straightening said knee-joint, means in operative connection with said primary lever for feeding the tool to the work, means for releasing said lever actuated means when the operation of the tool is completed, and means for withdrawing the tool and reversing the action of said knee-joint to unclamp the work.

8. A machine of the class described, comprising, in combination, a power actuated tool, a work-support, a work-clamping lever having its free end in operative proximity to the work, a normally relaxed knee-joint connected with said lever for actuating the same to clamp the work when the knee-joint is straightened, a primary actuating lever, means in operative connection therewith for straightening said knee-joint to apply stress to said clamping lever, means in operative connection with said primary lever for feeding the tool to the work, means for withdrawing the tool from the work when the operation is completed, means for bending said knee-joint to release said clamping lever, and means for automatically discharging the work when the clamping lever is released.

9. A machine of the class described, comprising, in combination, a power actuated tool, a work support, means for clamping the work thereon, clamp releasing means, means for feeding the tool to the work, means for restoring the tool to a normal position, a source of compressed air, means for directing a jet of air against said work support, a primary actuating lever and mechanism in operative connection with said actuating lever for severally actuating said work clamping means, said clamp releasing means, said tool feeding and restoring means, and for admitting said compressed air to said air directing means after the release of said work-clamping means to remove chips from said work-support.

10. A machine of the class described, comprising, in combination, a power actuated tool, a work-support, a primary actuating lever, lever-actuated means for clamping the work upon said support, lever-actuated means for feeding the tool to the work, means for releasing the lever-actuated means when the operation is completed but before the end of the primary lever stroke, means for restoring the tool and the work clamping means to their respective normal positions, a sliding air actuated piston having a gage-stop thereon for discharging the work, and means, brought into action upon the latter part of the primary lever stroke upon the release of said first named lever-actuated means, for forcing air against said piston to discharge the work.

11. A machine of the class described, comprising, in combination, a power actuated tool, a work-support, a primary actuating lever, means in operative connection with said lever for clamping the work upon said support, means in operative connection with said lever for feeding the tool to the work, means for releasing the connection with the primary actuating lever of said work-clamping and tool-feeding means when the operation is completed and before the end of the primary lever stroke, means for restoring the tool and work-clamping means to their respective normal positions, a slidable work-gage yieldingly held in a normal position, a piston movable within a cylinder for actuating the same to discharge the work, and lever controlled means brought into action at the latter part of the primary lever stroke for forcing air into the cylinder to actuate said piston.

12. A machine of the class described, comprising, in combination, a power-actuated tool, a work-support, a primary actuating lever, means in operative connection with said lever for clamping the work upon said support, means in operative connection with said lever for feeding the tool to the work, means for releasing the connection with said actuating lever of said work-clamping and tool-feeding means when the operation is completed and before the end of the primary lever stroke, means for restoring the tool and work clamping means to their respective normal positions a slidable work-gage for gaging and discharging the work, a cylinder and piston, the latter of which is connected with said work gage, means for yieldingly holding said piston in a normal position, lever controlled means brought into action at the latter part of the primary lever stroke for forcing air into the cylinder to actuate said piston, and means for simultaneously directing a jet of air against said rest to discharge the chips.

13. A machine of the character described, comprising, in combination, a work support, work-clamping means for clamping work thereon, an actuator in operative connection with said clamping means to cause the clamping and releasing of said work, and pneumatic means in operative connection with said actuator for discharging said work when released.

14. A machine of the class described, comprising, in combination, a work-support, work-clamping means for clamping work thereon, an actuator in operative connection with said clamping means to cause the clamping and releasing of the work, a gage for gaging the position of the work, a cylinder and piston, the latter of which is in operative connection with said gage, a source of compressed air, and means controlled by said actuator for admitting air under pressure to said cylinder for moving said gage to discharge the work.

15. A machine of the character described comprising a tool holder, a work holder, a primary source of power for rotating said tool holder, means independent of said primary source of power for moving the tool holder and work holder relatively to feed the tool to the device acted upon, and a retracting device for moving the tool holder and work holder relatively to separate them, said retracting device independent of said primary source of power and said means for moving the tool holder and work holder relatively to feed the tool to the device acted upon, and a clamping device actuated from said means for moving the tool holder and work holder relatively, for clamping the work to the work holder at the beginning of the relative movement of the tool holder and work holder and for releasing the work by the time the tool holder and work holder reach their initial separated positions.

16. A machine of the character described comprising a tool holder, a tool carried thereby, a tool guide bushing having an opening through which the tool passes, said bushing provided with an opening at one side of the tool for delivering a stream of lubricant against the tool, a work holder, a primary source of power for rotationg said tool holder, means independent of said primary source of power for moving the tool holder and work holder relatively to feed the tool to the device acted upon, and a retracting device for moving the tool holder and work holder relatively to separate them, said retracting device independent of said primary source of power and said means for moving the tool holder and work holder relatively to feed the tool to the device acted upon.

17. A machine of the character described, comprising in combination, a power actuated tool, a work-support, a lever actuated clamping device for clamping the work upon said support, a lever actuating tool feeding device for feeding the tool to the work, a movable actuating part for actuating said clamping device and tool feeding device, means for releasing said clamping device and tool feeding device from said movable actuating part when the drilling operation is completed, a retracting device for withdrawing the tool from the work, and a separate retracting device for moving the clamping device to its initial position.

18. A machine of the character described, comprising, in combination, a power actuated tool, a work-support, a lever actuating clamping device for clamping the work upon said support, a lever actuated tool feeding device for feeding the tool to the work, a movable actuating part for actuating said clamping device and tool feeding device, means for releasing said clamping device and tool feeding device from said movable actuating part when the operation is completed, a retracting device for withdrawing the tool, a retracting device for moving the clamping device to its initial position and a discharging device for discharging the work when released.

19. A machine of the character described, comprising, in combination, a power actuated tool, a work-support, a lever actuated feeding device for feeding the tool to the work, and an oil controlling device for directing a jet of oil under pressure against the tool and work during the operation of the former.

20. A machine of the class described, comprising, in combination, a power actuated tool, a work-support, a lever actuated clamping device for clamping the work upon said support, a lever actuated feeding device for feeding the tool to the work, and an oil controlling device for directing a jet of oil under pressure against the tool at an acute angle to the axis of the tool during its operation to cause the fresh cool oil to enter the flutings or the tool and absorb heat.

21. A machine of the class described, comprising, in combination, a power actuated tool, a work-support, a lever actuated clamping device for clamping the work upon said support, a lever actuated feeding device for feeding the tool to the work, an oil pump, an oil conductor in operative connection therewith for directing a jet of oil against the tool and work, a valve for shutting off said jet when the operation is completed, and an air-chamber in operative connection with the discharge side of the pump piston for continuing the oil pressure to the last instant while permitting an excess movement of the piston.

22. A machine of the class described, comprising, in combination, a power actuated tool, a work-support, a lever-actuated clamping device for clamping the work upon said support, a lever actuated feeding device for feeding the tool to the work, a primary actuating lever operatively connected with said clamping device and feeding device, means for releasing said clamping device and tool feeding device from said movable actuating part when the operation is completed, a retracting device for restoring the tool to its normal position, a retracting device for restoring the work-clamping means to its normal position, a discharging device for discharging said work when released and a lever actuated chip removing device operatively connected with said primary actuating lever and adapted when the lever has been moved to a predetermined position to direct a jet of compressed air upon said work-rest to remove chips therefrom.

23. A machine of the class described, comprising, in combination a power actuated tool, a work support, a work-clamp, a knee-joint for clamping the work in place when the knee-joint is straightened, and means for bending the knee-joint to release the work when the operation is completed.

24. A machine of the class described, comprising, in combination, a power actuated tool, a work-support, a knee-joint mechanism for clamping the work thereon when the knee-joint is straightened, means for bending the knee-joint to release the work when the operation is completed, and yielding means interposed between said knee-joint and the clamping member to provide for a yielding action of the latter.

25. A machine of the character described, comprising, in combination, a power actuated rotating tool, a driving shaft therefore, means for normally holding the same in an inoperative position, a work-support, work clamping means for clamping work thereon, tool feeding means separate from said driving shaft, for feeding said tool to the work, an actuator and means for operatively connecting said actuator with said work-clamping and tool-feeding means respectively.

26. A machine of the character described, comprising, in combination, a power actuated tool held normally in an inoperative position, a work-support, a work-clamping device, a tool-feeding device, an operating lever and operative connections between said operating lever and said work clamping and tool feeding devices for separately actuating said work clamping and tool-feeding devices.

27. A machine of the class described, comprising, in combination, a power actuated rotating tool, a driving shaft therefore, a work support, primary actuating means, means in operative connection with said primary actuating means separate from said driving shaft, for moving the tool into and out of an operative position and means, also in operative connection with said primary actuating means for automatically clamping the work to and releasing it from said support.

28. The combination with a tool of a bushing having an oil passage therein for directing a jet of oil into contact with the tool and means for forcing oil into said passage.

29. A machine of the class described, comprising, in combination, a power actuated tool, a work-support, a tool feeding device for bringing the tool into and out of an operative position, and a work clamping device for automatically clamping the work to said work support while the tool is in its operative position and for releasing the work from said work support when the tool is in inoperative position.

In testimony whereof I have signed this specification in the presence of two subscribing witnesses, this fifth day of September, 1915.

THEODORE P. CAULKINS.

Witnesses:
DAVID H. FLETCHER,
JENNIE L. FISKE.